Figure 1:
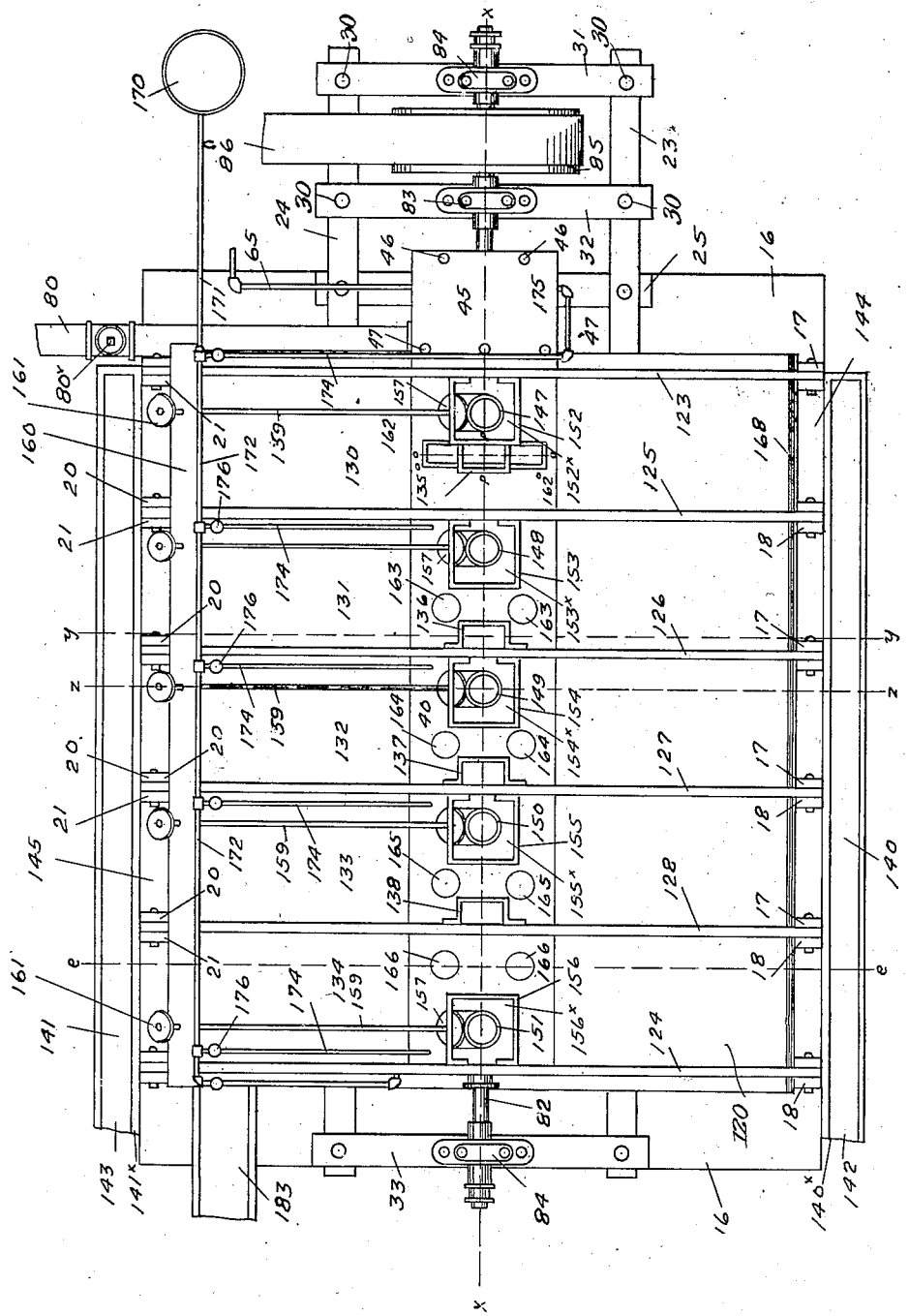

R. T. MISHLER.
APPARATUS FOR SEPARATING OILED CONCENTRATES FROM THE GANGUE OF ORES.
APPLICATION FILED SEPT. 13, 1915.

1,197,843.

Patented Sept. 12, 1916.
6 SHEETS—SHEET 1.

WITNESSES:
C. L. Bronson
L. L. C. Hasson

INVENTOR
Ralph T. Mishler
BY
Rich & Manning
ATTORNEY

R. T. MISHLER.
APPARATUS FOR SEPARATING OILED CONCENTRATES FROM THE GANGUE OF ORES.
APPLICATION FILED SEPT. 13, 1915.

1,197,843.

Patented Sept. 12, 1916
6 SHEETS—SHEET 2.

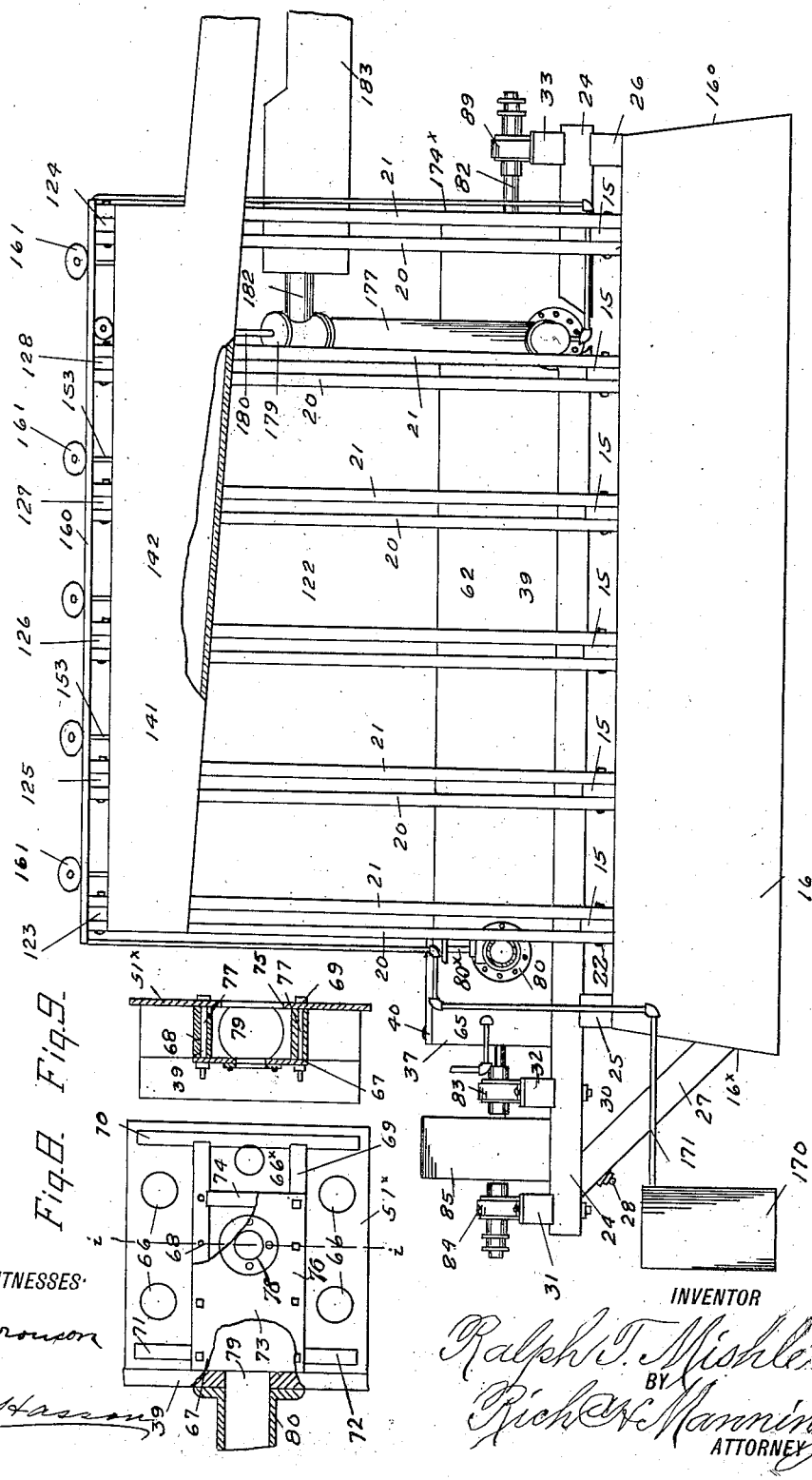

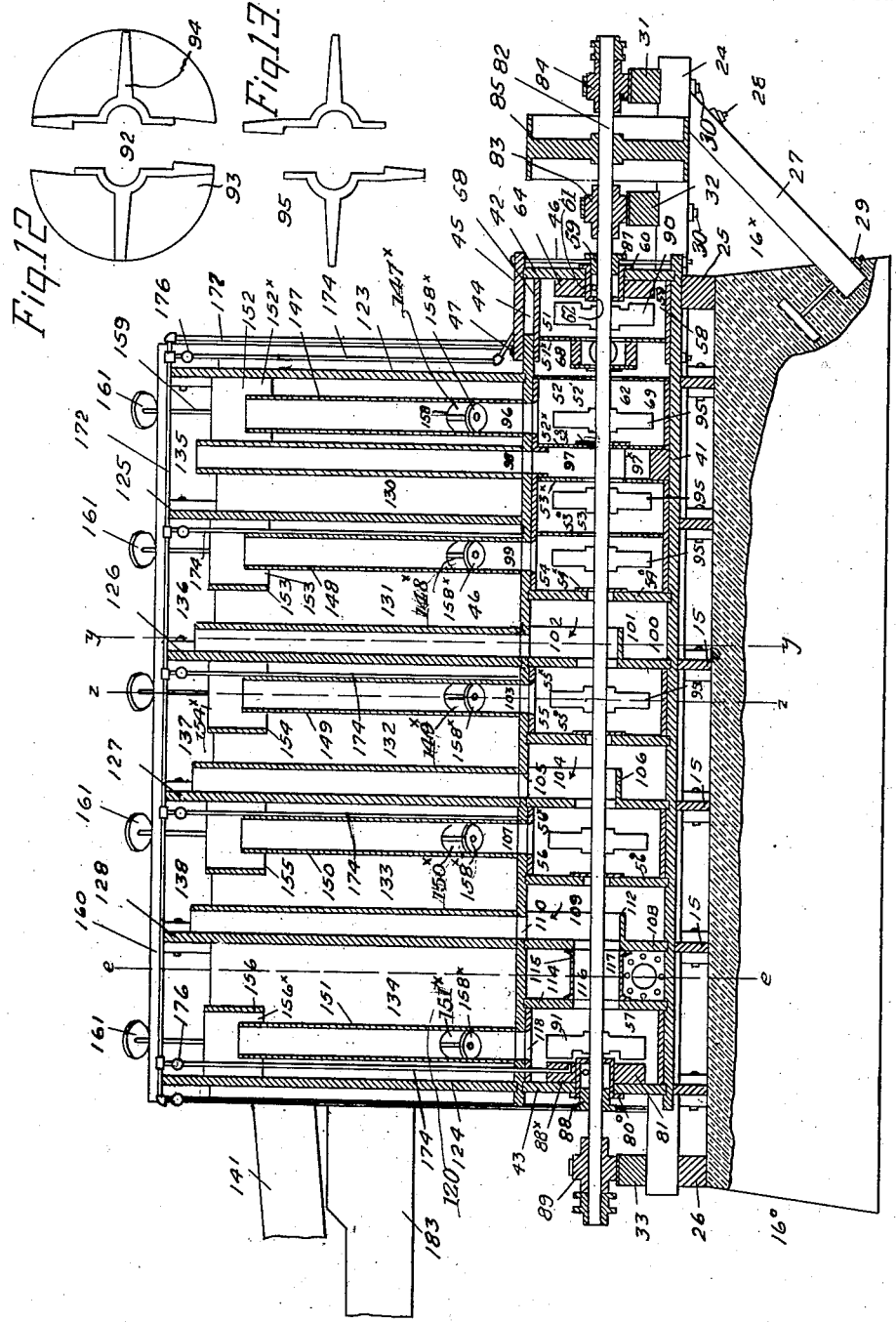

R. T. MISHLER.
APPARATUS FOR SEPARATING OILED CONCENTRATES FROM THE GANGUE OF ORES.
APPLICATION FILED SEPT. 13, 1915.
1,197,843.
Patented Sept. 12, 1916.
6 SHEETS—SHEET 5.
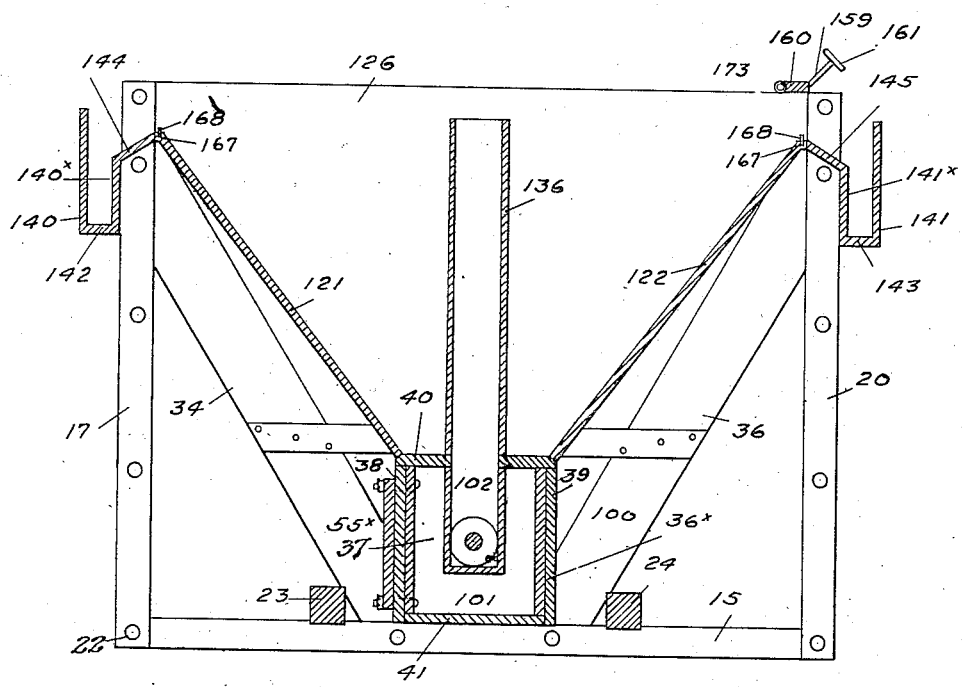
Fig. 5.
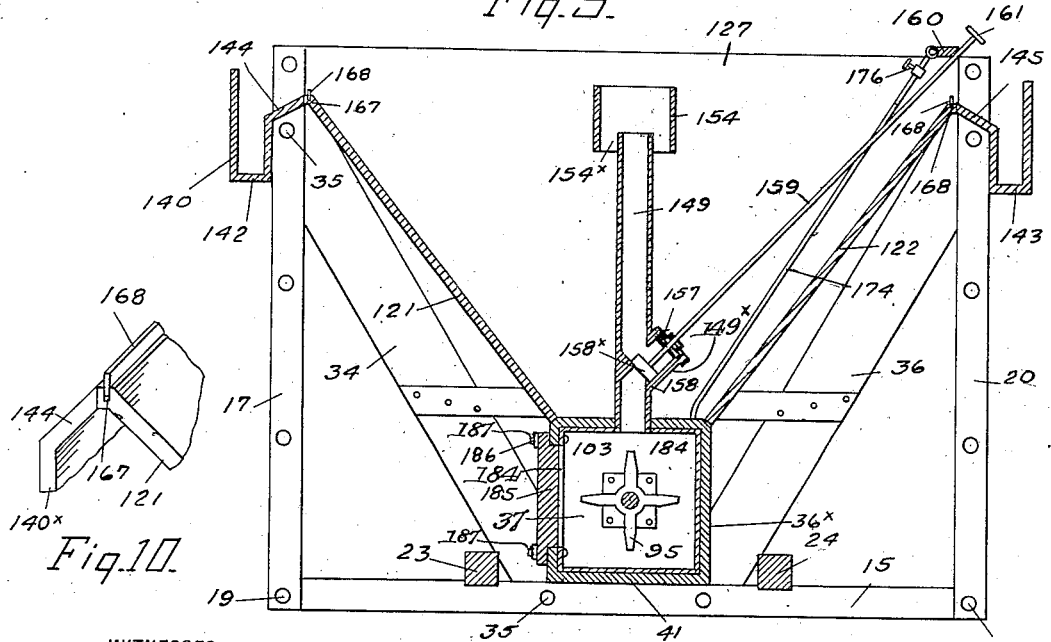
Fig. 10.
Fig. 6.
WITNESSES:
C. L. Brown
INVENTOR
Ralph T. Mishler
BY
Rich. H. Manning
ATTORNEY R. T. MISHLER.
APPARATUS FOR SEPARATING OILED CONCENTRATES FROM THE GANGUE OF ORES.
APPLICATION FILED SEPT. 13, 1915.
1,197,843.
Patented Sept. 12, 1916.
6 SHEETS—SHEET 6.
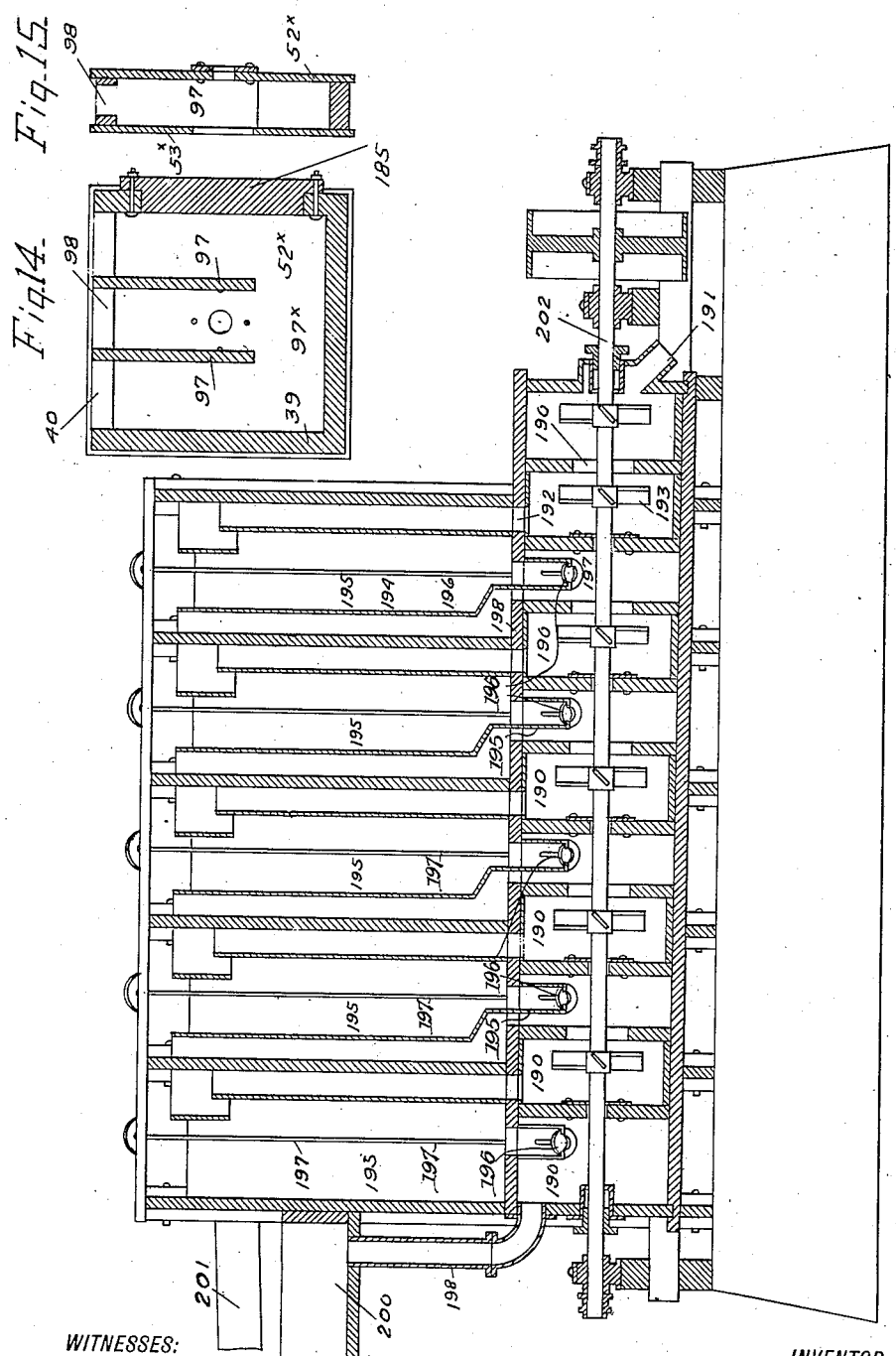

UNITED STATES PATENT OFFICE.

RALPH T. MISHLER, OF POMONA, CALIFORNIA.

APPARATUS FOR SEPARATING OILED CONCENTRATES FROM THE GANGUE OF ORES.

1,197,843.  Specification of Letters Patent.  Patented Sept. 12, 1916.

Application filed September 13, 1915. Serial No. 50,457.

*To all whom it may concern:*

Be it known that I, RALPH T. MISHLER, a citizen of the United States of America, and a resident of Pomona, in the county of Los Angeles and State of California, and temporarily residing at Esqueda, State of Sonora, Republic of Mexico, have invented certain new and useful Improvements in Apparatus for Separating Oiled Concentrates from the Gangue of Ores; and I do hereby declare that the following is a full, clear, and exact description of the invention, reference being had to the accompanying drawings, forming a part of this specification.

The objects of the invention are: First: To separate the concentrates from the gangue during a repeated agitation of the pulp, in the presence of air or other gas, such agitation being followed by a period of quiescence or separation, when the concentrate rises to the surface, and overflowing, while the gangue settles to the bottom and is subjected to agitation and separation during successive alternating periods, in order to remove the remaining traces of the concentrate. Second: In an apparatus of the character described, to provide a series of alternating agitation and separation chambers. Third: To maintain a minimum power consumption, by simultaneous agitation of the gangue in the agitation chambers. Fourth: To obtain maximum extraction and grade of concentrate by agitation of the gangue, in the presence of air or other gas, and under the pressure of a considerable height of pulp, thereby obtaining the advantage of the expansion of the gas bubbles, as they rise to the surface, carrying the concentrate. Fifth: To obtain from the impulses imparted to the pulp by the agitation in all of the separation chambers, an approximately uniform overflow level for the concentrate. Sixth: To prevent resettling of the concentrate, by minimizing agitation in the separation chambers. Seventh: To prevent the settlement of sand, and the consequent clogging of the apparatus; and Eighth: To transfer the pulp from one chamber to another, within zones of intense pulp agitation.

The invention consists in the novel construction and combination of parts, such as will be first fully described, and then specifically pointed out in the claims.

Figure 7:
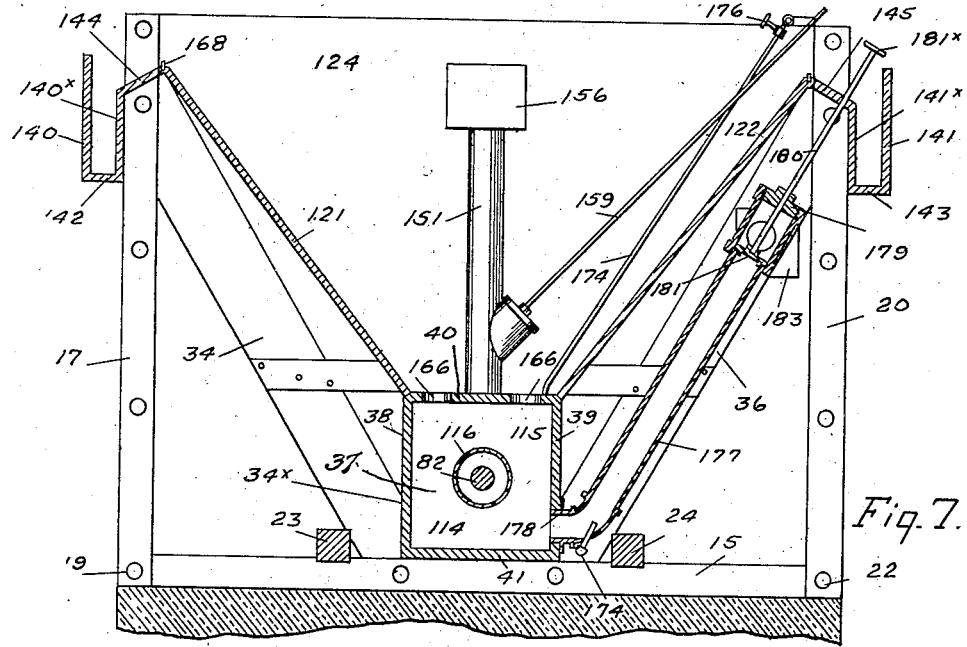
Figure 2:
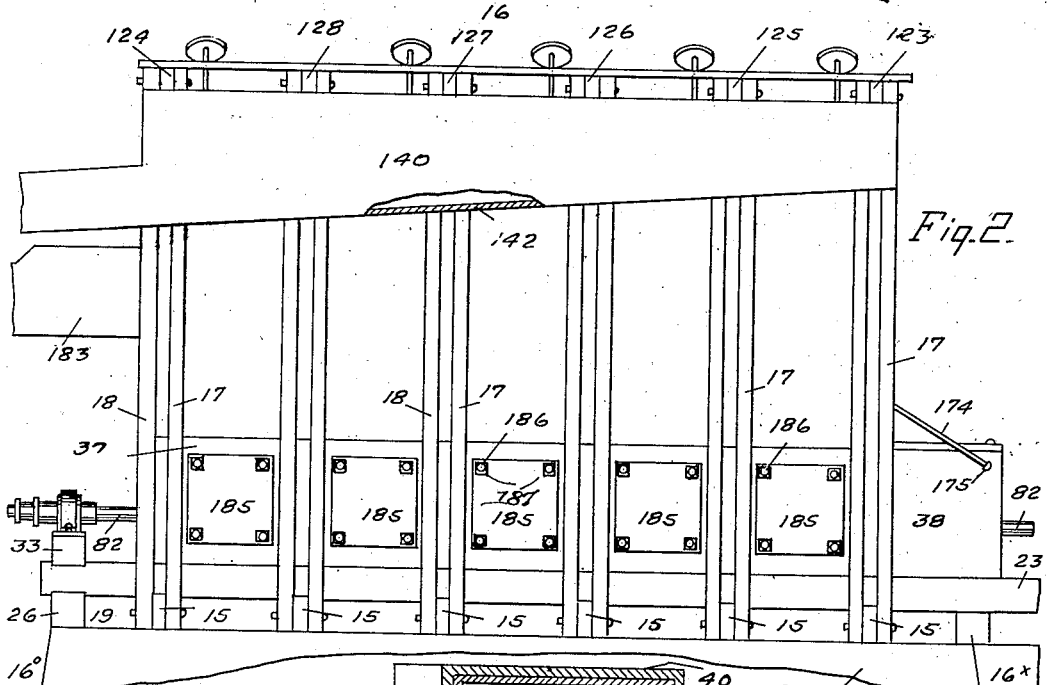
Figure 11:
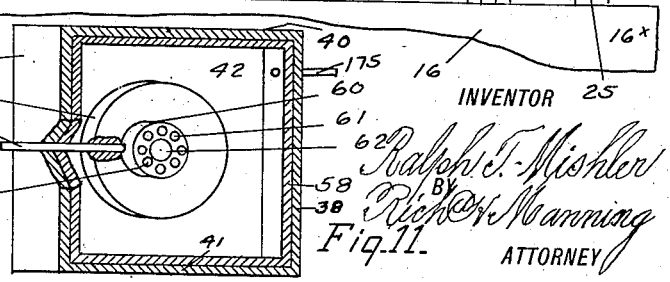

In the drawings: Figure 1. is a plan view of the invention. Fig. 2. is a forward, side elevation partly broken away; and Fig. 3. is a rear, side elevation of the apparatus. Fig. 4. is a longitudinal, vertical, sectional view, taken on the line $x, x$, in Fig. 1. Fig. 5. is a transverse, sectional view, taken on the line $y, y$, in Fig. 1, showing the passage for air, from the agitation to the separating chamber. Fig. 6. is a transverse, sectional view, taken on the line $z, z$, in Fig. 1, showing the pulp impellers and controlling valve. Fig. 7. is a transverse, sectional view, taken on the line $e, e$, in Fig. 1. Fig. 8. is an innerside view, enlarged, of the partition plate to the agitation chamber at the forward end of the apparatus, showing the pulp conducting box, a part of the cap plate to the box being broken away to show the inlet opening for the pulp. Fig. 9. is a transverse, sectional view of the agitation chamber, taken on the line $i, i$, in Fig. 8. Fig. 10. is a view in perspective, enlarged, of the upper end portion of the side of the separating receptacle and launder, showing adjustable lip. Fig. 11. is an isometric view, in detail, of the inner surface of the forward end plate to the pulp agitating box, showing the perforate ring for the irrigation of the bushing. Figs. 12. and 13 are detail side views of the separable pulp impellers. Fig. 14 is a transverse, vertical, sectional view of the pulp agitating box, taken on the line $o, o$, in Fig. 1, looking forward, and showing the partition, the baffle plates being in section; and Fig. 15. is a vertical, sectional view, taken through the box on lines $p, p$, in Fig. 1, showing the partitions to the air compartment and baffle plates. Fig. 16. is a longitudinal, sectional view of the invention, similar to that seen in Fig. 4. showing modifications.

Similar numerals of reference indicate corresponding parts in all the figures of the drawings.

The frame of the apparatus consists of a series of transverse bed beams 15, which are laid edgewise upon the upper surface of a concrete foundation or bed 16, which foundation is as shown of approximate length and width to the structure. These beams, as shown, six in number, are laid parallel in position, and spaced at equal distances apart, the first beam at the forward end 16ˣ, of the foundation, and the last beam at the rear end 16°, of the foundation, being laid at short distances inwardly from the outer surfaces of said ends.

Vertical standards 17 and 18 are secured by the bolts 19, to the opposite surfaces and corresponding ends of the beams 15, upon one side of the structure, and vertical standards 20 and 21 are secured by the bolts 22, to the corresponding ends of the beams 15, upon the other side of the structure. Upon the upper surface of the beams 15, and extending in the longitudinal direction of the foundation or bed 16, are secured rigidly the longitudinal beams 23 and 24, the forward ends of which beams extend a considerable distance forward of the line of the forward surface of the end 16ˣ. These beams 23 and 24 are spaced apart equidistant from each other, and the respective standards 17, 18, upon one side, and the standards 20 and 21, upon the other side of the structure. The forward ends of the beams 23 and 24 are supported by a short, transverse beam 25, extending parallel with the beams 15, and supported upon the bed 16 in line with the forward surface 16ˣ, and the rear ends of the beams are supported by a transverse beam 26, adjacent the rear surface or end 16°, of said bed 16.

The forward ends of beams 23, 24 are further supported and braced by brace beams 27, secured by bolts 28 to the lower surfaces of said beams at their upper ends, and to the bolts 29, anchored in the concrete bed 16, at their lower ends (see Fig. 4).

Upon the upper surface of the forward ends of beams 23 and 24, and secured by the bolts 30, are the transverse shaft supporting beams 31 and 32, spaced apart a considerable distance. At the rear ends of the beams 23 and 24, and secured to the upper surface of said beams directly above the beam 26, is a transverse shaft supporting beam 33. Between the standards 17 and 18, at points a short distance downwardly from the upper ends of said standards are extended the upper ends of brace beams 34, and secured thereto by the bolts 35. The lower ends of said beams are inclined inwardly, and extend past the line of the inner surface of the longitudinal beam 23, and to the line of the rear surfaces of the beams 15, and are secured thereto by the bolts 35. The lower end portions of the brace beams are cut away in a vertical line obliquely to the beams, as at 34ˣ. Brace beams 36 are secured to the standards 20, in the same manner as described of braces 34, their lower ends extending past the line of the inner surface of the longitudinal beam 24, and are cut away in a vertical line oblique to the braces, as at 36ˣ.

Between the lower ends of these braces 34 and 36, and the respective vertical surfaces 34ˣ, 36ˣ, and in the longitudinal direction of the beams 23 and 24, is extended the long inner chambered longitudinal pulp agitating case or box 37, square in cross section, the ends of which box extend to positions in parallel lines with the outer surfaces of the respective transverse beams 25 and 26. The box or case comprises vertical side members 38 and 39, top member 40, and a bottom member 41. Located a short distance inwardly from the forward end of the box is an end member or plate 42, extending upwardly to the plane of the outer surfaces of the top, and a rear end member or plate 43, hermetically connected with the inner surfaces of the top and bottom and side members of the said case or box. In the top member 40, of the box 37, and at the forward end, is an opening 44, closed by a cap plate 45, for the purpose of inspecting the interior of the box. This cap plate is secured by the bolts 46, which pass through the plate 45, adjacent the outer surface of the end member 42, and through the bottom member 41. Other short bolts 47, secure the rear portion of the plate 45, to the top member 40, of the said case or box.

Within the box 37 are formed a series of pulp agitating chambers 51, 52, 53, 54, 55, 56 and 57 (see Fig. 4), as further described. The chamber 51 is formed at the forward end of the box, the spaces being inclosed by a transverse partition 51ˣ (see Fig. 8), arranged in position in a vertical line with the inner end of the opening 44, in the top member of the box 37. Upon the inner surfaces, of the chamber 51 is a lining 58, composed of hardwood or metal, as preferred, the outer surfaces of the plate 51ˣ being hermetically secured to the said lining, at the respective top, bottom and side members, portions of which are seen in section, in Fig. 11.

In the forward member 42, of the pulp agitating box, at a point equidistant from the lines of the inner surfaces of the box, is an axial opening 59, in which is a circular, flanged socket plate or stuffing box 60, having an inner ring 61, in which is a central shaft opening 62, and concentric with said opening are a series of openings 63, for the discharge of water, as further described. Extending around the stuffing box 60 is an annular flat plate 64. 65 is a water supply pipe, supplied by water from any suitable source, under pressure. The inner end of the pipe extends through the side member 39, of the pulp agitating box, thence through the periphery of the plate 64, within the side of the socket plate 60 (see Fig. 11).

In the upper and lower portions of the partition plate 51 (see Fig. 8) are openings 66 for the passage of the pulp from the chamber 51ˣ outwardly. Upon the outer surface of the plate 51ˣ is a box 67, rectangular in form and located between the upper and lower openings 66. The box is composed of horizontal upper and lower side members or plates 68 and 69, secured edgewise to the plate 57×, spaced apart from each other, and above and below an axial line extending through said plate. A vertical end plate 70 is secured to the plate 51×, in the direction of the side member 38 of the box, having notches for the ends of the plates 68 and 69. The ends of the plates 68 and 69, in the direction of the side member 39 of the box 37, are connected with the inner side of separate vertical plates 71 and 72, having an opening 73 to the box. The length of the box is fore-shortened by a vertical end plate 74, secured to the horizontal plates 68 and 69, intermediate the vertical plate 70, and the axial line of the plate 51×, through which extends a large opening 75, concentric with the shaft 82, for the pulp. A cap plate 76 closes the outer side of the box, and extends to the end plate 74, and is secured by the bolts 77 to said plate 51×. This provides for an opening 66×, in plate 51×, between the said cap plate 76 and plate 70. Through said cap plate 76 extends a shaft opening 78, in the line of the longitudinal axis of the box 37.

In the side member 39 of the pulp agitating box is an opening 79, which communicates with the opening 73, in the box 67. 80 indicates the main supply pipe for pulp to the pulp agitating chamber 51, through box 67, its further movement being described in the operation of the apparatus. The flanged inner end of the pipe 80 is connected with the outer surface of the side member 39, of the pulp agitating box, its opening communicating with the opening 79, in said side member. In the pipe 80 is a cut-off valve 80× (see Fig. 3).

82 indicates the longitudinal rotary shaft, for the propulsion and agitation of the pulp, one end of which is extended through the socket plate 60 and shaft opening 62, in the end plate or member 42, of the pulp agitating box, thence extended through the pulp opening 75, in the plate 51×, thence through the shaft opening 78, in the cap plate 76, thence rearwardly through the chambers 52, 53, 54, 55, 56 and 57, and through a stuffing box 80°, in the rear end member or plate 43, said stuffing box being similar to box 60 and without the perforations.

The forward end of the shaft 82 is journaled within the journal box 83, on the upper surface of the transverse beam 32, thence extended to and journaled within the shaft journal box 84, on the upper surface of the transverse beam 31. Upon the shaft 82, between the journal boxes 83 and 84, is mounted a drum 85. Extending around said drum is a belt 86, extending to the driving wheel, upon an engine not shown.

In the outer end portions of the stuffing boxes 60 and 80°, are extended the bushings 87 and 88, respectively, these bushings extending around the shaft 82, and being made preferably of case hardened steel.

The rear end portion of shaft 82 is journaled in a journal box 89, on the upper surface of the transverse beam 33. Upon shaft 82, within the chambers 51 and 57, are pulp impellers or rotary paddle wheels 90 and 91, respectively, located at slight distances from the respective annular plates 64 and 88×. These pulp impellers are each provided with a separable hub 92 and radial blades 93, for attachment to shaft 82. From one blade 93 to the other extends a web 94 (see Fig. 12). The other impellers 95 consist of radial blades, without the webs, as seen in Fig. 13, these blades being arranged upon the shaft 82, in the respective chambers 52, 53, 54, 55 and 56. These chambers are separated by partitions, arranged approximately the same distance apart (see Fig. 4), the forward partition 52′, to the chamber 52, being the same as the partition 51×, and provided with an opening for the passage of the pulp, concentric with the shaft 82, which partition 52′ is located within the pulp agitating box, a short distance in rear of the box 67, on plate 51×. A chamber 97, narrow in width, from which air or other gases are liberated under pressure, as further described, is formed in rear of the portion 52×, the partition 53×, to the chamber 53, forming the rear wall to the chamber 97.

The rear, transverse partition plate 52×, to chamber 52, is arranged a distance in rear of the partition plate 52′, approximate to the dimensions of chamber 51, and is provided with a shaft opening, reinforced by a washer 52°, on shaft 82, and bolted to said plate. In the top member 40, of the agitating box 37, leading from the chamber 52, is a discharge opening 96, for the pulp.

In rear of the chamber 52 the narrow compartment 97× provides for the escape of air, entering with the pulp within chamber 52, through forward partition 52′, of chamber 52 (see Figs. 14 and 15). In this chamber 97 are baffle plates 97, extending downwardly a short distance past the line of shaft 82, around the lower ends of which baffle plates 97, the air passes up the passage 98 and flue 130.

The partition 53° separates the chamber 53 from the chamber 54, which has a rear partition 54°, and a washer 54×, concentric with shaft 82. In the top member 40, of the agitation box, is an opening 99, for the pulp, leading from chamber 54.

Between the partition 54° and the forward portion of chamber 55 is a chamber 100, for air, and a horizontal baffle plate 101, extending beneath the concentric opening around the shaft. In the upper portion of the chamber 100, and in the top member 40, of the agitating box, is an opening 102, rectangular in form (see Fig. 5). In the top member 40, of the pulp agitating box, is an opening 103 (see Fig. 4) circular in cross-section and leading from the chamber 55. In rear of the rear partition 55°, to chamber 55, is an air chamber 104, similar to the chamber 100, the forward partition 56ˣ, of the chamber 56, being the rear partition of the chamber 104. This partition is provided with a discharge opening, concentric with shaft 82, and a baffleplate 106 extending horizontally from said partition 56ˣ, beneath the said discharge opening.

In the top member 40, of the pulp agitating box, is an opening 105, rectangular in form, leading from chamber 104. The shaft opening in the rear partition 56° to chamber 56, is provided with a washer, concentric with shaft 82, in like manner as the partition 55°. In the top member 40 of the pulp agitating box is an opening 107, for the pulp, which is the same as the opening 103.

In rear of the rear partition 56°, of chamber 56, is a partition 108, and between said partitions 56° and 108, is an air chamber 109, which is similar to the chamber 104, an opening 110 extending from the top member 40, of the pulp agitating box leading from said chamber. A corresponding distance in rear of the partition 108 to that between partitions 55° and 108, is located a partition 114 (see Fig. 7), and between said partitions is formed the compartment 115, from which the tailing is discharged. In these partitions, concentric with shaft 82, are large openings, a pipe 116 having flanged ends 117 being extended between said partitions concentric with shaft 82, and secured rigidly and hermetically to the inner surfaces of said partitions, in line with said openings.

In the chamber 109, beneath the line of the pipe 116, is a horizontal baffle plate 112, which is the same as the baffle plate 106, in chamber 104. Between the partition 114, and the rear end plate 43, of the pulp agitating box is the chamber 57, in which is the pulp impeller 91. In the top member 40, of said pulp agitating box, is an opening 118, for the upward movement of the pulp.

Upon the longitudinal portion of the upper surface of the pulp agitating box 37 are mounted the lower edge portions of a V-shaped separating tank 120, for the pulp, composed of the side members 121 and 122, which extend from said upper surfaces of the pulp agitating box 37 upwardly and outwardly to the line of the upper ends of the braces 34 and 36. The forward and rear end members 123 and 124, respectively, conform to the inclined side members of the tank, and extend upwardly to the line of the upper end portion of the standards 17 and 20, the portions of said end members above the line of the upper edges of the side members 121 and 122 extending between the upper ends of the respective standards 17 and 18, upon one side of the structure, and the standards 20 and 21, upon the other side of the structure, and bolted thereto, hence together with the frame composing the braced standards, the swelling of the wood tightens the joints throughout the apparatus.

With the side members 121, 122, of the tank, are transverse partitions 125, 126, 127 and 128, which are hermetically connected with the inner surface of said side members 121 and 122, and extend upwardly the same height as that of the end members 123 and 124, the portions of the said partition plates extending above the line of the upper edges of the side members 121 and 122, of the tank, also extending between the upper ends of the respective standards 17, 18, and bolted thereto. The partitions 125, 126, 127, 128 are spaced at equal distances from the end members 123, 124 of the tank, and from each other, hence are in vertical lines with the transverse base beams supporting the pulp agitating box 37. Between said partitions are formed the open receptacles 130, 131, 132, the partitions 126, 127 and 128 being adjacent the rear end portions of the respective openings or passages 102, 105 and 110, in the top member 40, of the pulp agitating box and frame, and form the rear walls to the vertical air shafts or tubes 136, 137, 138, in the respective separating receptacles 131, 132 and 133. These air shafts are rectangular in cross section, the lower end portion of the air shaft 136, in receptacle 132, being connected with the opening or passage 102, in the top member 40, of the pulp agitating box, and the lower ends of the tubes 137 and 138, in the respective receptacles 132 and 133, being connected with the respective openings 105 and 110, in said top member 40.

In the receptacle 130 the air shaft is located, intermediate the forward end 123, of the tank and the partition 125, the lower end of the flue being connected with the opening or passage 98, in said top member 40. The upper end portion of each flue extends in height a short distance above a line horizontal with the upper ends of the side members 121 and 122 of the tank, there being none in receptacle 134. Upon the outer surface of the standards 17, 18, upon one side of the frame of the apparatus, and the standards 20, 21, upon the other side, and at points a short distance downwardly from the line of the upper end portions of the side members 121 and 122, to the respective receptacles 130, 131, 132, 133 and 134, are arranged the longitudinally extended concentrate discharging boxes or launders 140 and 141. These launders extend in length from the line of the forward standards 17, 18, 20, 21, of the frame of the apparatus a considerable distance from the line of the rear vertical standards; the bottom members 142, 143 of the respective launders being inclined downwardly and rearwardly.

With the upper surfaces of the side members 121, 122, of the tank containing the separate receptacles for the concentrate are connected the upper edge portions of the longitudinal plates 144 and 145, respectively, the lower longitudinal edge portions of which plates extend outwardly between standards 17 and 18, upon one side, and 20 and 21 upon the other side of the apparatus and are inclined downwardly to and in contact with the longitudinal upper edge portions of the respective inner side members or plates 140ˣ, 141ˣ, of the launders 140 and 141, said plates 144 and 145 forming overflow guiding plates for the concentrate.

Within the respective receptacles 130, 131, 132, 133 and 134, for the pulp, are the vertical pulp conducting stand pipes 147, 148, 149, 150 and 151, the lower end portions of which pipes are connected with the respective openings 96, 99, 103, 107 and 111, the upper ends of which pipes extend upwardly to a position a short distance below a line horizontal with the upper edge portions of the sides 121 and 122, to the tank and said receptacles, said pipes being shown circular in cross section (see Fig. 1).

Extending around the upper end portion of each pipe are box frames or hoods 152, 153, 154, 155 and 156, respectively, each box frame having four side members, larger in dimensions than the pipes and open at the top and bottom, the box frames in the receptacles 130 and 134 being secured to the forward and rear end members 123 and 124, respectively, to the tank, the other box frames being secured to the partitions 125, 126, 127. Between the upper ends of the pipes and the inner surfaces of the sides of the respective box frames are passages 152, 156ˣ, 154ˣ. In the lower portion of each pipe 147, 148, 149, 150 and 151 is an upwardly inclined branch elbow 147ˣ, 148ˣ, 149ˣ, 150ˣ, 151ˣ, respectively, each elbow having a cap plate 157, provided with a threaded opening, seen in section in Fig. 6. Within each pipe elbow is an inclined valve seat 158, which extends from the junction of the lower end portion of the elbow to the opposing inner surface of the tube or pipe, in which seat is a valve 158ˣ. With the valve 158ˣ is connected the inner end of a rod 159, which is screwthreaded and extends outwardly through the screwthreaded opening in the cap plate, the upper end of which rod extends upwardly through a guiding strip 160; said strip extending longitudinally of the apparatus and secured at its end portions to the upper surfaces of the end members 123 and 124, of the separating tank, and immediately within the lines of the inner surfaces of the standards 20 and 21. Within each receptacle 130, 131, 132, 133 and 134, the pulp conducting pipes are provided with similar valves and valve rods, the upper end of each rod having a hand wheel 161.

In the top member 40, of the agitating box 37, and adjacent the vertical air tube 135, are pulp openings 162ˣ, leading within the compartment or chamber 67. The sides of these openings, as shown, are at right angles. In the receptacle 131, and in the top member 40, are openings 163, leading to the compartment or chamber 100. These openings are circular in form. In the receptacle 132 are openings 164, leading within the compartment or chamber 104. In the receptacle 133 are openings 165, leading within the compartment or chamber 109, and in the receptacle 134 are openings 166, leading within the chamber 115.

In order to regulate the overflow of the concentrate from these receptacles 130, 131, 132, 133 and 134, in the upper longitudinal portion of the side members 121 and 122 are longitudinal grooves 167, of considerable depth, in which grooves are fitted snugly the longitudinal, vertically movable pulp guiding strips 168 (see Fig. 10).

The means for charging the pulp with air or other gases consist of a receiver 170 (Fig. 1), containing the gas to be employed under compression. With this receiver is connected one end of a gas conducting pipe 171, which extends above the main supply pipe 80, for the pulp to the apparatus, thence upwardly to a position in line with the inner surface of the strip 160, supporting the valve operating rods 159, and connected with a longitudinal pipe 172, extending parallel with said strip 160, to a position adjacent the outer surface and rear end of said strip. With this pipe 172 are connected the upper end portions of the series of branch pipes 174, the lower ends of which pipes extend into the respective receptacles 131, 132, 133 and 134, and are extended through the top member 40, of the pulp agitating box, in communication with the respective chambers 54, 55, 56 and 57 (see Figs. 1, 6 and 7). The branch pipe at the forward end of the apparatus extends downwardly in proximity to the outer surface of the forward end member 123, of the tank, in the direction of the forward side member 38, of the pulp agitating box, and is bent at right angles and extended through said side member, in communication with the pulp agitating chamber 51. The branch pipe 174, at the rear end of the apparatus, extends downwardly to the line of the lower surfaces of beam 24, supporting the pulp agitating box 37, thence bent at right angles and connected with the lower portion of the discharge pipe 177 (see Figs. 3 and 7).

The air conducting pipe 174, within the separating receptacle 134, and which extends downwardly adjacent the inner surface of the rear end 124, of the tank, passes downwardly through the disk 81, on the stuffing box 80°, and outwardly between the bushing or stuffing box and the impeller, with the said end adjacent thereto, the compressed air occupying this space between the impeller and stuffing box, while the heavier pulp will be maintained at the periphery of the rotary impeller by its centrifugal force, thus protecting the stuffing box from the pulp. In order to gain the advantage of this principle, in the last pulp agitating chamber 57 the pulp from the separation receptacle 133 enters the pulp agitating chamber 57, through the pipe 116, which surrounds the shaft 82.

In the upper end portions of each branch pipe 174 is a cut-off valve 176. The discharge pipe 177, for the tailings, is connected at its lower end with the opening 178, in the side member 39, of the pulp agitating box, leading within the chamber 115 (see Fig. 7). The upper end of the pipe 177 extends upwardly, and is inclined outwardly in the direction of the standards 20, 21. Upon the upper end of said pipe is a screw-threaded perforate cap 179, through which cap extends the lower end of a valve rod 180, and upon said end is a sliding valve 181. Upon the upper end portion of said rod is a hand bar 181×. A branch pipe 182 is connected with the side and upper end of the pipe 177, and extends within the rear, vertical end portion of a tailing launder or box 183, secured to the inner surface of the standards 20, 21, at the rear end portion of the frame of the apparatus.

To facilitate repairs, openings 184 are made in the side member 38, of the pulp agitating box leading to the respective agitating chambers, as seen in Figs. 6 and 14, which are closed by doors 185, which doors are removably secured by bolts 186 and nuts 187, to the said side member of the pulp agitating box 37.

In operation, ground ore, with which is mixed oil to form a pulp, is conducted through the main supply pipe 80, and the opening 79, in the box 67, on the partition 51×, then through the passage 75, concentric with shaft 82, into the pulp agitating chamber 51. Power being applied to the belt 86, rotation is imparted to the band wheel 85, and the series of paddle wheels or pulp impellers in the respective chambers are rotated at the proper degree of speed. In the chamber 51, the pulp is thoroughly agitated by the paddle wheel or pulp impeller 90. During the rotation of the paddle wheel 90, compressed gas, such as air, is conducted from the storage tank 170 to the respective branch pipes 174, the valves 176 in which pipes are opened, and through the pipe 174, leading into the pulp agitating chamber 51, the pulp being charged with gas. The aerated pulp is then forced by the action of the impeller 90, through the apertures 66, 66×, in the partition plate 51' (the periphery of which impeller is adjacent said apertures), into the chamber 52, in which additional agitation is given the pulp by the paddle wheel 95, and a forward impulse imparted to the pulp from the centrifugal force of the pulp against the walls of the chamber, and due to which force the pulp passes into the pipe 147, thence upwardly within said pipe, past the valve 158×, which is opened the proper extent to throttle the upward impulse of the pulp, so as to maintain at the proper height the overflow level of the concentrate, in the pulp separating receptacle 130. Upon leaving the pipe, the pulp passes downwardly within the inner surfaces of the box frame 152 which prevents wave motion from being imparted to the concentrate, the excess air escapes upwardly into the atmosphere, while the thoroughly agitated pulp passes downwardly into the separating receptacle 130. A state of quiescence of the pulp is now maintained in the pulp separating receptacle 130, which permits the separation of the metallic sulfid minerals from the ore gangue, the sulfid minerals being carried to the surface of the pulp which has flowed into the receptacle, so as to rise to a height slightly above the upper end of the pipe 147. The sulfid minerals now rise to the surface of the pulp carried by the multitude of minute oil bubbles, that have been churned into the pulp agitating chamber. At the same time, the gangue material and a small amount of concentrate sink to the bottom of the pulp separating receptacle 130 and pass through the opening 162, in the top member 40, of the pulp agitating box, into the intermediate compartment 97, located between the pulp agitating chambers 51 and 52. The pulp, after entering the said intermediate compartment 97, through the apertures 162, passes into the space below shaft 82, and between the partition plates of said compartment, the lower portion of which plate acts as baffle to the pulp, then passes into the pulp agitating chambers 53 and 54, through the openings in the partition plates 53× and 53°. Compressed air is admitted to the chamber 54, through the branch pipe 174. From the pulp agitating chamber 54, the pulp is forced by the action of the impeller 95, upwardly through the pipe 148, into the pulp separating receptacle 131, the pulp passing through the opening 163, in the top member 40, of the pulp agitating box into the compartment 100, having the baffle plate 101, within the chamber 55, around shaft 82, thence forced into the separating receptacle 132, thence through the stand pipe 149, the pulp passing through the openings 164, in the bottom of said receptacle, thence into the pulp agitating chamber 56, and from said chamber into the pulp separating receptacle 133, thence through the openings 165, in the bottom of said receptacle, into the compartment having the baffle plate 112, thence through the pipe 116, into the agitating chamber 57, into the separating chamber 134, and finally through the opening 178, in the compartment 115, through the pipe 177, and past the valve 181, which is opened the proper extent, and thence to the tailing launder 183, from whence it is discharged. The excess of air escaping along the shaft from the pulp agitating chambers is trapped by the baffle plates 97, 101, 106 and 112, in the respective compartments 97$^x$, 100, 104 and 109, and carried upwardly through the flues 135, 136, 137 and 138, to the atmosphere, without molesting the quiescence of the pulp in the separating receptacles. The concentrate in the respective receptacles 130, 131, 132, 133 and 134, flows over the adjustable strips 168, into the launder or discharge chutes 140 and 141, this flow being regulated by the vertical adjustment of said strips, and also by the hand wheels 161, controlling the valves 158, in the respective pipes 147, 148, 149, 150 and 151, which control the forward impulses given to the pulp by centrifugal force of the pulp impellers in the pulp agitating chambers.

The novel principle of the invention consists in the agitation of the pulp, while submerged, in which air or other gas is mixed with the pulp while so agitated, and these results taking place under the pressure of the pulp at a considerable height in the separating receptacles, directly above the pulp agitating chambers. By this means the pressure in the pulp agitating chambers is increased and a greater volume of air or other gas may be admixed with and churned into the pulp per volume of pulp, than is possible when the agitation of the pulp occurs at the surface. The buoyant action upon the concentrate of this increased volume of gas, as it rises to the surface and expands, increases the recovery of the concentrate. Furthermore, it is demonstrated by the invention that a cleaner concentrate is produced by the rupture at the surface of a portion of the sulfid bearing bubbles, the concentrate thus liberated attaching itself to the underlying bubbles, while the liberated gangue slides from their surfaces. It is evident that bubbles recently expanded or still distending are more liable to rupture at the surface than are non-expanded bubbles, hence the expansion of the bubbles aids the production of a clean concentrate. For the above reasons, submerged pulp agitation in the presence of air or other gas improves both the recovery and the grade of the concentrate.

In the modification shown in Fig. 16, the pulp is admitted to the pulp agitating chamber 190, at the forward end of the apparatus, through the inlet pipe 191, the ore forced up the pipe 192 by the action of the pulp impeller 193, the gangue passing downwardly from the bottom of the pulp separating receptacle 195, into a pocket 195, in the bottom of the receptacle, in which is a valve 197, controlled by the vertical rod 197, in a similar manner to the valve 158, in Fig. 1, the flow of the pulp being shown by the arrows. The other pulp agitating chambers and separating receptacles in Fig. 16, are essentially the same in the modified apparatus, omitting the baffle plates, as seen in Figs. 4 and 14, and hence the pulp flows in the manner described in the other pulp agitating chambers and separating receptacles, as first described in the chamber 190, and the separating receptacles into which the pulp is first received. In the last separating receptacle the discharge of the gangue last separated is through a discharge pipe 198, leading from the upper portion and rear end of the agitating chamber 190, upwardly into the launder 200, for the tailings. In this instance, the blades of the pulp impellers are placed at a tangent to the axis of the rotary shaft 202, and constitute fan blades, the rotation of which may be regulated to limit the centrifugal force of the pulp, and hence the overflow into the concentrate launders.

Such other modifications may be employed as are within the scope of the appended claims.

Having fully described my invention, what I now claim as new and desire to secure by Letters Patent is:

1. In an apparatus for separating concentrate from the gangue of ores, the combination with a longitudinal pulp receiving case, provided with transverse partitions separating the interior of said case into pulp receiving chambers, and with superposed pulp separating receptacle supported by said case and provided with passages from the respective pulp separating chambers, of pulp conducting stand pipes for conducting the pulp from one pulp receiving chamber to a superposed pulp separating receptacle, and having their lower ends connected with the inlet passages from the pulp receiving chambers, said chambers being provided with separate outlet passages leading from said pulp separating receptacles to said pulp receiving chambers, a longitudinal shaft extending through said case and said chambers, and means on said shaft within said chambers for forcibly discharging the pulp from said chambers through said stand pipes above the level of the pulp in the pulp separating receptacles.

2. In an apparatus for separating concentrate from the gangue of ores, the combination with a pulp receiving case provided with separate chambers for receiving the pulp, and with superposed pulp separating receptacles communicating with said chambers, of a rotary shaft provided with pulp agitating and forcing devices extending through said case and said chambers, means for imparting a rotary movement to said shaft, and a pipe for conducting the pulp from one pulp receiving chamber to another, which is larger in circumference than and concentric with said shaft, and forming therein zones of pulp agitation.

3. In an apparatus for separating concentrate from the gangue of ores, the combination with a case provided with separate pulp receiving chambers, and with superposed pulp separating receptacle, of pulp conducting stand pipes for conducting the pulp from said pulp receiving chambers to said pulp separating receptacles, and located in the latter receptacles, means for agitating and forcing the pulp through said stand pipes, and means for charging the pulp in said chambers with air under pressure, stand pipes within said pulp separating receptacles connected with the pulp receiving chambers, and hoods extending around the discharging ends of said stand pipes and having passages between the inner surfaces of the hood and the outer surfaces of the stand pipe for liberating the excess of compressed air following the pulp without disturbing the quiescence of the pulp in the superposed pulp separating receptacles.

4. An apparatus for separating concentrate from the gangue of ores, comprising a pulp receiving case having partitions separating the interior of said case into a number of inclosures or chambers, and an air compartment intermediate said chambers, superposed pulp separating receptacles having inlet passages from the respective chambers, and outlet passages leading to the respective air compartments, air flues connected with the said air compartments leading outwardly through said pulp separating receptacles, stand pipes for the pulp within the pulp separating receptacles connected with the receptacles, inlet passages from said chambers, and pulp forcing means for forcing the pulp through said pulp conducting pipes from said chambers.

5. In an apparatus for separating concentrate from the gangue of ores, the combination with chambers for receiving the pulp, and pulp agitating and forcing devices within said chambers, and with superposed pulp separating receptacles provided with inlet passages for the pulp leading to said chambers, of pulp conducting stand pipes within said receptacles connected with said inlet passages through which the pulp is forced into the separating receptacle, means for conducting air under compression to the pulp receiving chambers, and a pulp deflecting box frame having a passage between and extending around the discharging end of the stand pipe.

6. In an apparatus for separating concentrate from the gangue of ores by flotation, the combination with the pulp receiving chambers, of superposed pulp separating receptacles having inlet passages for the pulp from the corresponding pulp receiving chambers, stand pipes within the pulp separating receptacles connected with said inlet passages, and with means for aerating and forcing the pulp through said stand pipes, of branch pipes connected with the said stand pipes, and valves regulating the height of the pulp admitted to the separating receptacles within said branch pipes, and means for operating said valves.

7. In an apparatus for separating concentrate from the gangue of ores by flotation, the combination with the pulp receiving chambers, and the superposed pulp separating receptacles, having inlet passages for the pulp leading therein from the corresponding pulp receiving chambers, and with air chambers intermediate said pulp receiving chambers, of air tubes connected with said air chambers, a rotary shaft extending horizontally through said pulp receiving chambers and said air chambers, pulp impellers upon said shaft, a source of compressed air, and conductors of the air leading to and aerating the pulp within the pulp receiving chambers, and baffle plates beneath said rotary shaft, adapted to trap the air without molesting the quiescence of the pulp in the pulp separating receptacles.

8. In an apparatus for separating concentrate from the gangue of ores by flotation, the combination with a series of pulp receiving chambers, and air chambers intermediate said pulp receiving chambers, of a froth separating receptacle connected to each pulp receiving chamber, a rotary shaft extending through said pulp receiving and air chambers, means on said shaft for producing agitation and propulsion of the pulp, and a pipe concentric with said shaft extending through a pulp receiving chamber and connecting one of said air chambers with another, and having a passage larger in circumference and concentric with said shaft through which the pulp is admitted.

9. In an apparatus for separating concentrate from the gangue by flotation, the combination with a pulp receiving case, provided with partitions separating said case into chambers for the pulp, and intermediate compartments for air, said chambers having inter-communicating passages for the pulp, and a froth separating receptacle connected with each pulp chamber, a source of compressed air, and a conductor of the compressed air leading to one or more chambers in said case, a rotary shaft extending through said case and the said pulp receiving chambers, and air compartments, means on said shaft for imparting agitation and propulsion to the pulp in said chambers, and a pipe concentric with said shaft connecting one of said compartments with one of said chambers for the pulp, and having a passage for the air and pulp concentric with said shaft.

10. An apparatus for separating concentrate from the gangue of ores by flotation, consisting of a longitudinal case provided with partitions separating the interior of said case into a series of pulp receiving chambers, and compartments for air interposed in succession between adjacent pulp receiving chambers, said chambers having passages for the pulp from one chamber to an adjoining chamber, a superposed pulp separating tank provided with partitions separating said tank into a number of pulp separating receptacles, a rotary shaft extending through the ends of said case and said chambers, and compartments, and having means thereon for agitating and imparting centrifugal motion to said pulp, said chambers and compartments having inlet and outlet openings for the pulp leading to corresponding pulp separating receptacles, conducting pipes for the pulp within the respective pulp separating receptacles connected with the said inlet passages from the chambers, and air ducts connected with the air compartments and extending upwardly within the said pulp separating receptacles.

11. In an apparatus for separating concentrate from the gangue of ores, the combination with a longitudinal case provided with transverse partitions separating said case into chambers for the pulp, superposed pulp separating receptacles having inlets for the pulp from the respective pulp receiving chambers, a rotary shaft extending through the end members of said case and said chambers, stuffing boxes in said end members, a rotary pulp agitator on said shaft within said chambers having webs adjacent said stuffing boxes, a source of compressed air, and a conductor of the air having a discharge opening between the stuffing boxes and said pulp agitator, and means for trapping an excess of air following the pulp and adjacent the rotary shaft.

12. An apparatus for separating concentrate from the gangue of ores by flotation, comprising a longitudinal case provided with transverse partitions separating the case into pulp receiving chambers having intercommunicating passages for the pulp, and intermediate air compartments, a pulp conveying pipe leading within the forward end of said case and the chamber adjacent thereto, a longitudinal rotary shaft extending through the end members of said case and said chambers and compartments, pulp agitating and forcing blades on said shaft, and a superposed tank having partitions separating said tank into pulp separating receptacles, said case having inlet and outlet passages for the pulp leading from an adjacent chamber and air compartment into a corresponding pulp separating receptacle, an air flue within the said pulp separating receptacles with the respective air compartments, a source of compressed air, and a conductor leading therefrom within the chamber adjacent the forward end member of said case, and a discharge pipe leading from one of the compartments adjacent the rear end of said case, an air pipe leading therein connected with the source of compressed air, and one or more pulp receiving and agitating chambers.

13. The combination in an apparatus for separating concentrate from the gangue of ores, a longitudinal case receiving the pulp having transverse partitions separating the case into pulp receiving chambers, and air compartments, a superposed tank provided with transverse partitions separating said tank into pulp separating receptacles, said chambers having passages for the pulp leading to corresponding receptacles, means for supplying aerated pulp to said chambers, baffle plates in said compartments, and passages for the air leading therefrom intermediate the baffle plates into the corresponding pulp separating receptacle to that receiving the pulp, and an air conductor connected with said passage for the air from the baffle plates.

14. The combination in an apparatus for separating concentrate from the gangue of ores, with a case for receiving the concentrate of a superposed pulp separating receptacle, said case being provided with transverse partitions separating the said case into pulp receiving chambers having intercommunicating passages and compartments, and with means for supplying the aerated pulp to said chambers, and means for forcing the pulp from one chamber to another through said passages, of baffle plates in said compartments extending part way from the top members of said case in the direction of the bottom of said case, said compartments having a passage for air in the top member of said case intermediate the line of the baffle plates, and an air duct within said pulp separating receptacle connected with said air passage.

15. The combination in an apparatus for separating concentrate from the gangue by flotation, the combination with a longitudinal case having transverse partitions separating said case into chambers for the pulp having intercommunicating passages and compartments for air, one of said compartments having baffle plates leading part way downwardly from the line of the top member of said case, and a passage for air extending upwardly from between the baffle plates through said top member, a superposed pulp separating receptacle into which said air passage extends, means for supplying aerated pulp to said pulp receiving chamber, one of said chambers adjacent said compartment having said baffle plates being provided with passages for the pulp leading to the compartment to the passages adjacent the outer surfaces of the baffle plates.

RALPH T. MISHLER.

Witnesses:
A. Y. WRIGHT,
I. O. PYLANT.